US007260237B2

(12) United States Patent
Nishimoto et al.

(10) Patent No.: US 7,260,237 B2
(45) Date of Patent: Aug. 21, 2007

(54) METHOD AND SYSTEM FOR GENERATING DATA OF AN APPLICATION WITH A PICTURE

(75) Inventors: Kyoko Nishimoto, Tokyo (JP); Yukiko Kumagai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 10/093,640

(22) Filed: Mar. 7, 2002

(65) Prior Publication Data

US 2002/0150277 A1 Oct. 17, 2002

(30) Foreign Application Priority Data

Apr. 13, 2001 (JP) ............................ 2001-115553

(51) Int. Cl.
*G06K 9/00* (2006.01)

(52) U.S. Cl. ...................... 382/100; 382/115; 382/118; 713/176; 713/186

(58) Field of Classification Search ................ 382/100, 382/232, 115, 118, 209, 210, 252, 287, 54, 382/51; 713/176, 182–186; 370/522–529; 235/380–382, 382.5
See application file for complete search history.

(56) References Cited

U.S. PATENT DOCUMENTS 5,949,885 A * 9/1999 Leighton ..................... 380/54
6,024,287 A * 2/2000 Takai et al. ................. 235/493
6,064,764 A 5/2000 Bhaskaran et al.
6,085,976 A * 7/2000 Sehr ........................... 235/384
6,095,566 A 8/2000 Yamamoto et al.
6,330,672 B1 * 12/2001 Shur .......................... 713/176
6,389,151 B1 * 5/2002 Carr et al. .................. 382/100
6,546,122 B1 * 4/2003 Russo ........................ 382/125

FOREIGN PATENT DOCUMENTS

JP 10-011509 A 1/1998
JP 10-285383 10/1998
JP 11-001081 A 1/1999

* cited by examiner

*Primary Examiner*—Bhavesh M Mehta
*Assistant Examiner*—Christopher Lavin
(74) *Attorney, Agent, or Firm*—Townsend and Townsend and Crew LLP

(57) ABSTRACT

A method for generating data of an application with a picture, has the steps of authenticating that a person who makes picture-attached application data is an applicant, acquiring private information identified by identification information offered by the applicant and setting it as an application entry, embedding facial portrait authentication information for authenticating that the image data of the facial portrait represents the applicant in image data of the facial portrait to produce facial portrait data of the applicant, generating application data by adding the generated facial portrait data to the application entry set with the private information, and embedding application data authentication information for authenticating the contents of the application data in the generated application data.

6 Claims, 9 Drawing Sheets

METHOD AND SYSTEM FOR GENERATING DATA OF AN APPLICATION WITH A PICTURE

BACKGROUND OF THE INVENTION

The present invention generally relates to a system for generating data for an application that includes a picture, and more particularly relates to an apparatus and method for generating data for an application that includes a substitution-prevention mark that is attached to a portrait of the applicant's face.

With the advent of the Internet, various content, such as electronic applications and electronic procurement requests, are transmitted via networks, e.g., the Internet. As a result of such Internet use, electronic administrative services provided by government ministries, local governments, businesses, and individuals have improved.

However, further improvements are needed for systems used by local governments to provide "one-stop" electronic services for issuing copies of resident cards and seal-registration certificates, for example, at one time (i.e., in a single electronic transaction). These system may be configured to use on day (e.g., holidays) on which government offices are closed or for "after hours" use when the offices are closed so that services for residents can be improved. Such system would provide the further advantage of reducing the work load of office workers (sometimes referred to as an "office counter workers" or "counter worker").

Some applications require that an applicant submit a facial portrait for attachment to a document, such as a driver license, a passport, or a personal history, wherein these documents might be submitted to governments or private companies for various purposes. Typically, to process such applications, the facial portrait provided by the applicant is required to be identified as a portrait of the actual applicant, and not another person. Therefore, a counter worker working at a government office of the like (and not a conventional-electronic-administrative service) will typically compare the facial portrait and the applicant's face to determine a match before processing the application.

Japanese Patent Application No.: JP-A-10-285383 discloses a private-information-generating method and system in which private information is embedded as watermark image information in original picture information (e.g., a portrait). Embedding private information in a portrait provides that the private information cannot be easily detected by a third party.

Therefore, new electronic administrative systems are needed for attaching facial portraits to applications and documents, wherein these systems are configured to detect whether a facial portrait submitted by an applicant is indeed a facial portrait of the applicant, and is not the facial portrait of another person. Such systems may thereby provide for the detection of illegal activity that may be associated with submitting a facial portrait that is not of the applicant.

SUMMARY OF THE INVENTION

It is an object of the invention to provide a method for solving the above identified problems, and efficiently generating reliable data for an application for which a facial portrait is submitted for application processing.

According to a specific embodiment of the invention, a system is provided that is configured to generate data for an application that includes a picture (e.g., a facial portrait), private information of an applicant, authentication information embedded in facial-portrait data for the facial portrait, and application data. The data for the application is sometimes referred to as picture-attached-application data.

According to another specific embodiment, the system is configured to compare biometrics of a person who prepares picture-attached-application data with biometrics information recorded on a recording medium, such as a resident card provided by the person, thereby authenticating that the person is the correct owner of the resident card, i.e., the applicant.

When the person is authenticated to be a legitimate applicant, the private information identified via the identification information (such as a resident code provided via the resident card) is retrieved from a database (such as a Basic Resident Register), and is added to the application data.

Thereafter, the face of the applicant is photographed and image data is generated therefore. A camera configured to photograph the applicant is incorporated in a picture-attached application data generation terminal apparatus. Facial-portrait-authentication information is embedded in the image data, so that the image data may authenticated. in order to confirm that the image data shows the facial portrait of the applicant. The image data and the facial-portrait-authentication information embedded therein is sometimes referred to as the facial-portrait data.

In addition, after the generated facial portrait data is added to the application entry set with the private information to produce application data, application data authentication information for authenticating the contents of the application data is embedded in the generated application data, thus producing picture-attached application data. This picture-attached application data thus produced is sent to the processor that accepts the application to execute the application processing.

Thus, according to the invention, since the facial portrait data has facial portrait authentication information embedded therein in order to authenticate that the image data shows the facial portrait of the applicant, the facial portrait data can be prevented from being modified dishonestly. In addition, since the picture-attached application data has application data authentication information embedded therein in order to authenticate the contents of the application data having the facial portrait data added to the application entry, the facial portrait data can be prevented from being switched.

Thus, according to the picture-attached application data generation system of the invention, since the picture-attached application data is produced by setting the private information of the applicant as an application entry and embedding authentication information in the facial portrait data and application data, highly reliable picture-attached application data can be efficiently produced.

Other objects, features and advantages of the invention will become apparent from the following description of the embodiments of the invention taken in conjunction with the accompanying drawings.

DETAILED DESCRIPTION OF EMBODIMENTS

The present invention generally relates to a system and a method for generating application data with a facial portrait.

Figure 1:
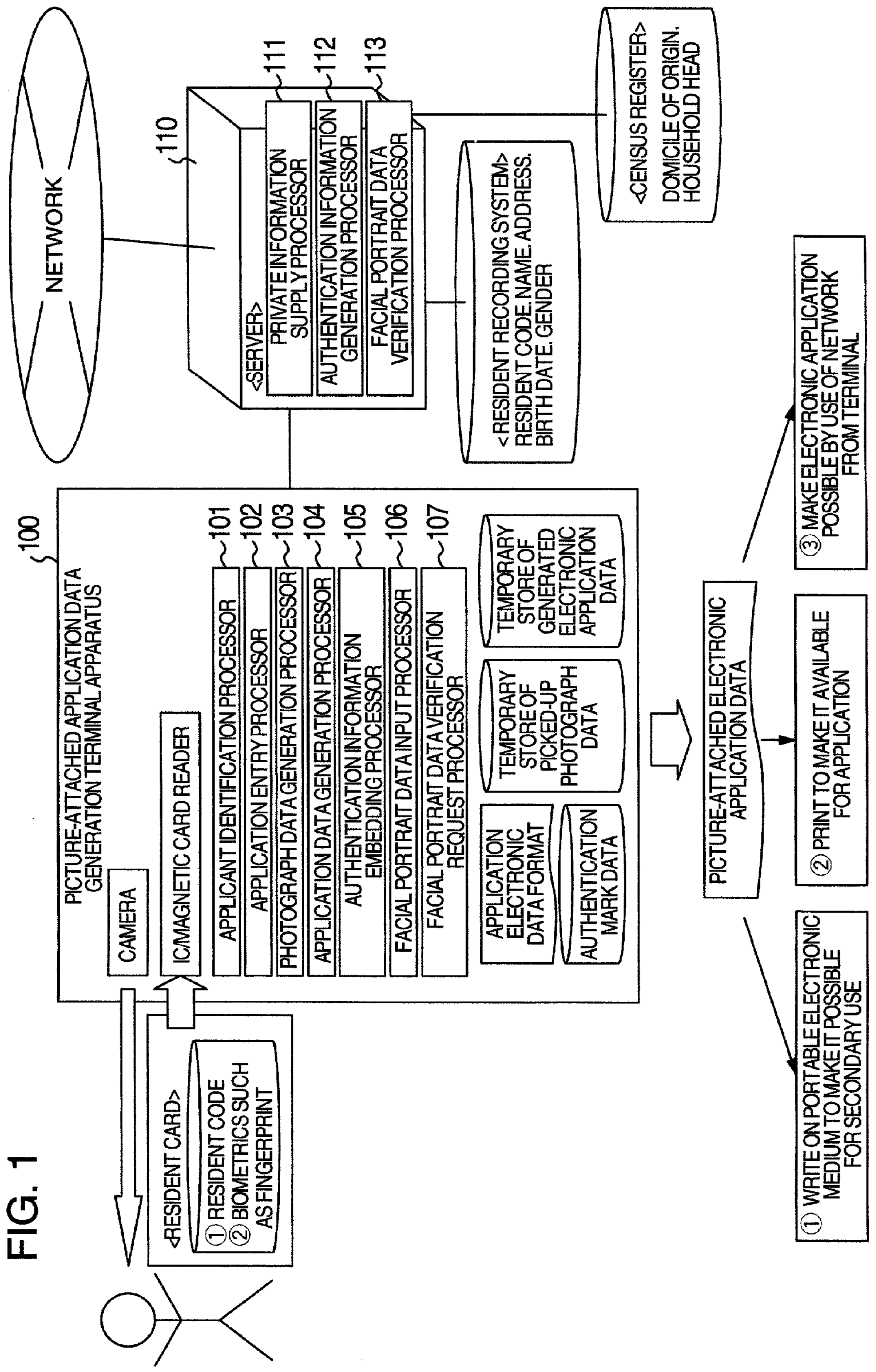
FIG. 1 is a simplified schematic that embodies a method for construction for a public application process according to an embodiment of the present invention.

FIG. 1 is a simplified schematic of a system configured to generate a public application according to an embodiment of the present invention. Specifically, the system is configured for generating application data with a facial portrait. The system includes a picture-attached application data generation terminal apparatus 100 and a server 110.

The picture-attached application data generation terminal apparatus 100 is is configured to generate application data with a facial portrait. The server 110 is a private information manager for managing private information used when the picture-attached application data is generated.

The picture-attached application data generation terminal apparatus 100 has an applicant identification processor 101, an application entry processor 102, a photograph data generation processor 103, an application data generation processor 104, an authentication information embedding processor 105, a facial portrait data input processor 106, and a facial portrait data verification request processor 107.

The applicant identification processor 101 checks if the person who prepares application data with a facial portrait is a "genuine applicant" (i.e., the portrait is of the applicant). The application entry processor 102 acquires, from the server 110, private information to be identified by identification information offered by the applicant and sets it as an application entry.

The photograph data generation processor 103 embeds authentication information for the facial portrait of the applicant in the image data to certify that the associated image data is the facial portrait of the applicant. "Facial portrait data" for the applicant includes the facial portrait with the embedded authentication information.

The application data generation processor 104 adds the generated facial portrait data to the application entry in which the private information was set (described above). The facial portrait data may be added to the application entry before or after other picture attached application data is generated. "Application data" for the application entry includes the private information and the facial portrait data.

The authentication information embedding processor 105 embeds authentication information in the application data to authenticate the application data. The facial portrait data input processor 106 enters the facial portrait data when other picture-attached application data is generated. The facial portrait data verification request processor 107 requests the server 110 to verify that the image data of the inputted facial portrait data is the facial portrait of the applicant.

The programs for making the picture-attached application data generation terminal apparatus 100 function as the applicant identification processor 101, application entry processor 102, photograph data generation processor 103, application data generation processor 104, authentication information embedding processor 105, facial portrait data input processor 106, and facial portrait data verification request processor 107 are recorded in a recording medium such as a CD-ROM, a magnetic disk, or the like. The programs may be loaded into a computer memory from the recording medium for execution. The programs may be installed from the recording medium into an information processor or may be accessed from the recording medium via a network.

Server 110 includes a private information supply processor 111, an authentication information generation processor 112 and a facial portrait data verification processor 113.

Private information supply processor 111 is configured to retrieve the applicant's private information from a resident recording system, such as a "Basic Resident Register." The resident recording system may include applicant information such as a resident code name, a resident address, a resident birth date, and gender. The applicant's private information is identified in the resident recording system via the resident code entered by the applicant who makes an application by filing picture-attached application data, and supplies this data to the picture-attached application data generation terminal apparatus 100.

The authentication information generation processor 112 generates application data authentication information for authenticating the contents of the application data, which is generated by adding the facial portrait data to the facial portrait authentication information. The application data authentication information is generated by adding the facial portrait data to the facial portrait authentication information, and is used for authenticating that the image data of the facial portrait shows the facial portrait of the applicant and the application entry set with the private information.

The facial portrait data certifying processor 113 is configured to review the facial portrait authentication information of the facial portrait data transmitted from the picture-attached application data generation terminal apparatus 100 to check if the image data is the facial portrait of the applicant.

The programs for causing the server 110 to function as the private information supply processor 111, authentication information generation processor 112 and facial portrait data certifying processor 113 are recorded on a recording medium such as a CD-ROM, a magnetic disk, or the like. The program may be installed from the recording medium into an information processor or may be accessed from the recording medium via a network.

The system shown in FIG. 1 may be configured for generating picture-attached application data, which is used to for public application processing, such as for processing for a driver's license application or a passport application. According to one embodiment, the identification information provided by the applicant is a resident code recorded in a resident card that the applicant possesses. In addition, the private information to be identified by the resident code is retrieved from the resident recording system and is used as the application entry.

Figure 2:
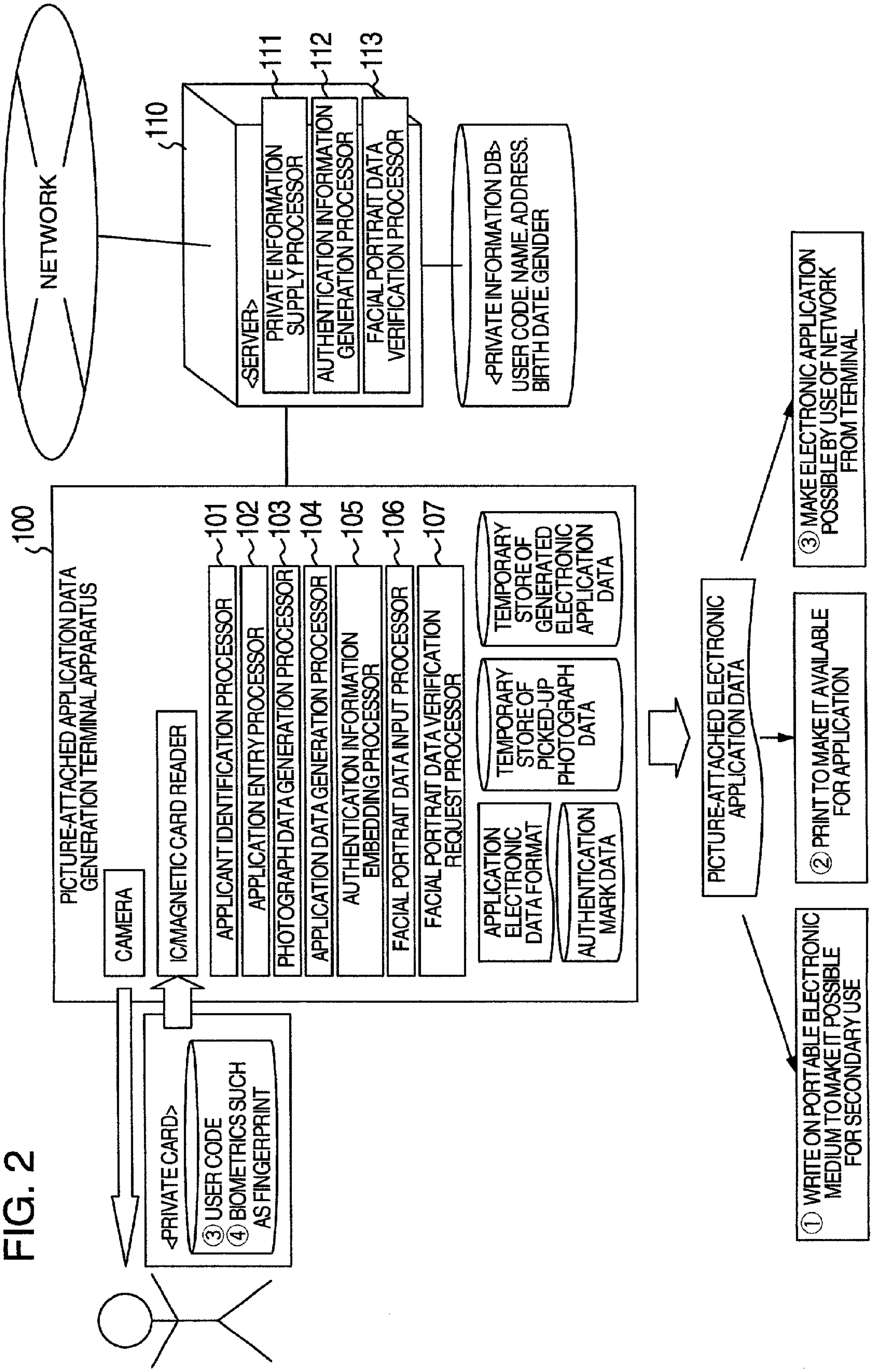
FIG. 2 is a simplified schematic that embodies a method for the construction for a nongovernmental application process according to an embodiment of the present invention.

FIG. 2 is a simplified schematic that embodies a method for the generation of a nongovernmental application according to an embodiment of the present invention. The system shown in FIG. 2 is for generating picture-attached application data that is used for nongovernmental application processing, such as processing in a banking company or a credit company. According to one embodiment, the identification information provided by the applicant is a user code recorded in a private card that the applicant possesses. In addition, the private information to be identified with the user code is retrieved from the private information database accumulated in the associated enterprise, and is used as the application entry.

Figure 3:
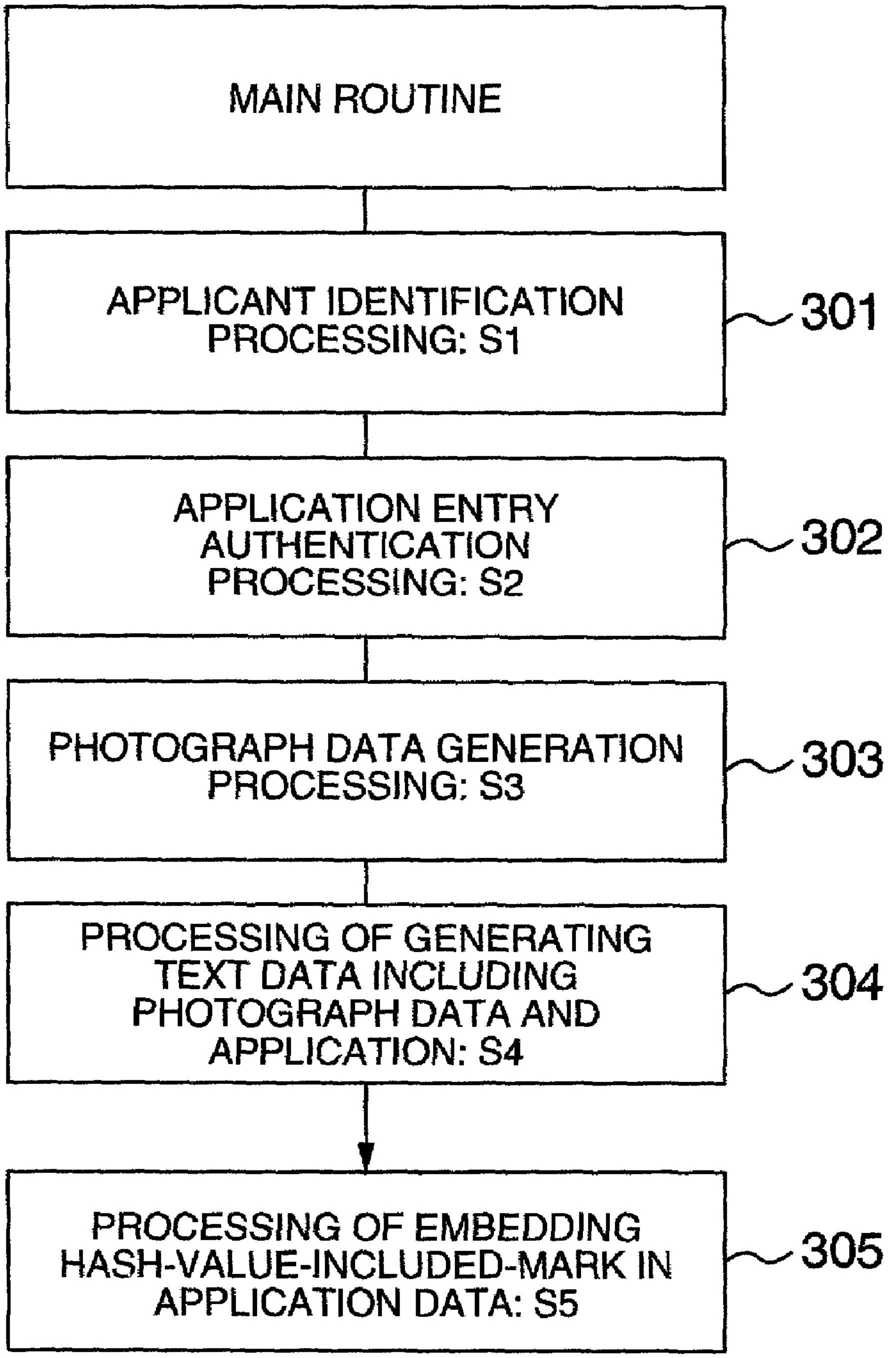
FIG. 3 is a flowchart having steps for a main routine procedure according to an embodiment of the present invention.

FIG. 3 is a flowchart of a main routine procedure according to one embodiment of the present invention. When the system accepts an instruction to generate picture-attached application data, the applicant identification processor 101 determines whether the person who makes the picture-attached application data is the applicant in step 301.

In step 302, the application entry processor 102 acquires from the server 110 the private information to be identified by the identification information offered by the applicant, and sets it as an application entry.

In step 303, the photograph data generation processor 103 embeds the facial portrait authentication information in the image data of the facial portrait of the applicant to authenticate that the image data is the facial portrait of the applicant, thus generating the facial portrait data of the applicant.

In step 304, the application data generation processor 104 generates the application data by adding to the application entry set with the private information the generated facial portrait data or the facial portrait data generated when other picture-attached application data is generated.

In step 305, the authentication information embedding processor 105 embeds the application data authentication information for authenticating the contents of the application data in the generated application data.

Figure 4:
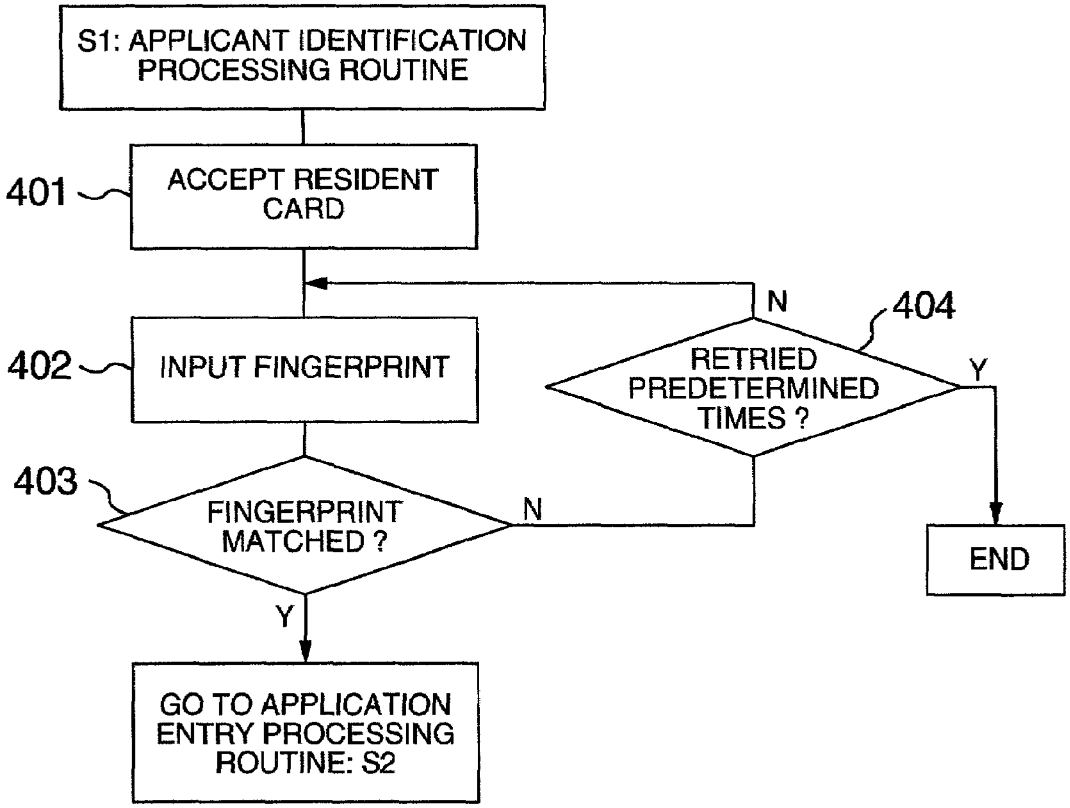
FIG. 4 is a flowchart having steps for an identification procedure according to an embodiment of the present invention.

FIG. 4 is a flowchart of an applicant identification procedure according to one embodiment of the present invention. While fingerprint information is used as biometrics in the applicant identification procedure of FIG. 4, other biometrics such as a voice pattern or an image of an iris may be used.

In step 401, the applicant identification processor 101 of the picture attached application data generation terminal apparatus 100 checks if whether the resident card of the person who prepares the picture-attached application data is has been detected by an IC/magnetic card reader. If the resident card has been detected, fingerprint information is read from the resident card.

In step 402, the fingerprint image of the person is retrieved, and fingerprint information (such as coordinate information of core and characteristic points, direction of ridge, chip image at or around the characteristic point) is extracted from the fingerprint image.

In step 403, the fingerprint information read from the resident card in step 401 is compared with the fingerprint information extracted from the fingerprint image of the person to determine whether the fingerprint information matches the fingerprint image. If fingerprint information and the fingerprint image match, the person is determined to be the applicant, and the processing proceeds to the application entry processing routine. If fingerprint information and the fingerprint image do not match, the processing proceeds to step 404 at which the comparison is repeated. The comparison may be repeated a number of times. If the system determines that the fingerprint information and the fingerprint image do no match the processes is ended.

In step 404, a determination is made of whether the comparison has been made a has been made a predetermined number of times. If the predetermined number of times has not been reached, the step 402 is repeated.

Figure 5:
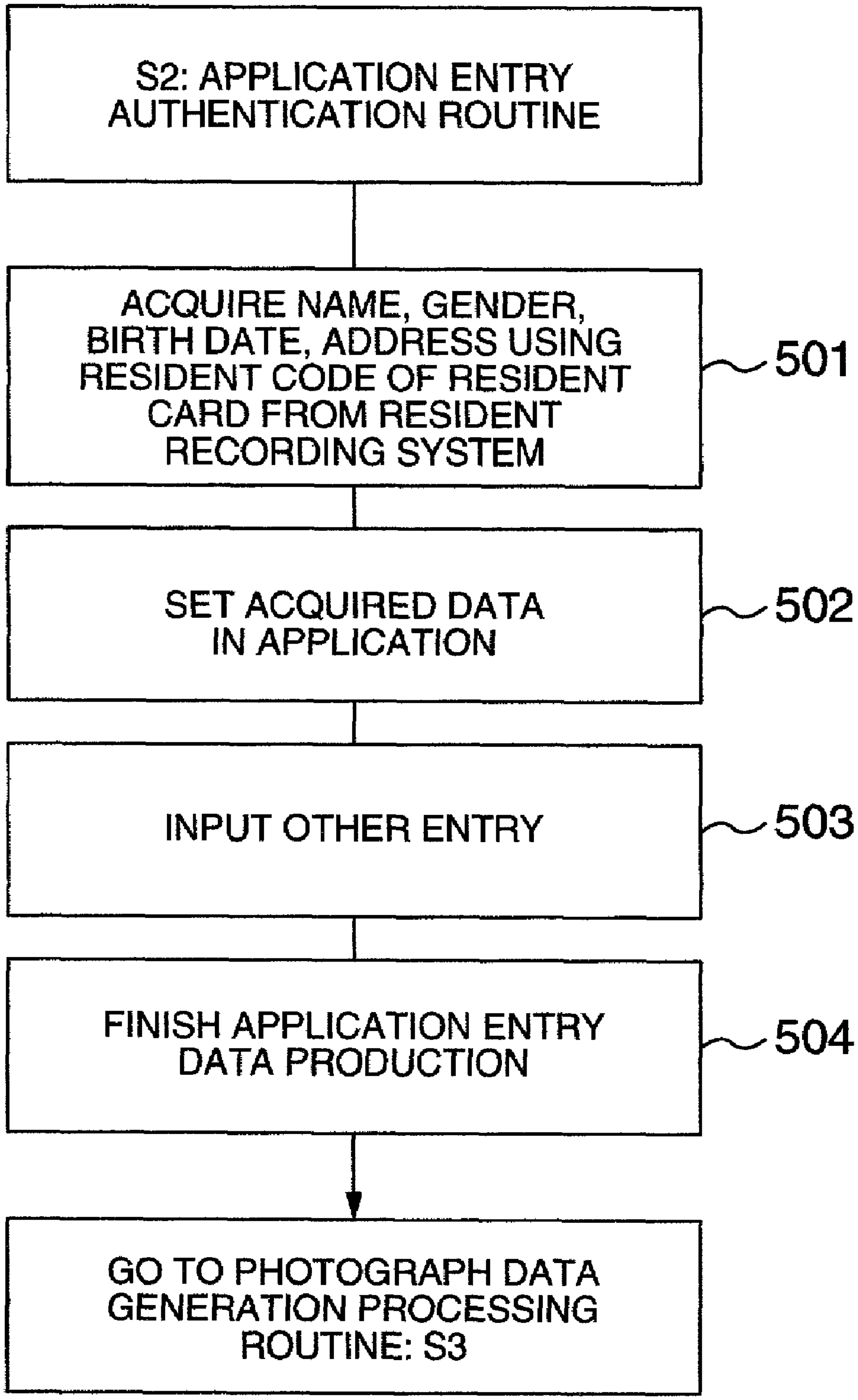
FIG. 5 is a flowchart having steps for an application entry procedure according to an embodiment of the present invention.

FIG. 5 is a flowchart of the application entry processing procedure according to one embodiment of the present invention. In step 501, the application entry processor 102 requests that server 110 send the private information (such as the name, the gender, the birth date, and the present address) so that the private information may be identified by the resident code retrieved from the resident card provided by the applicant.

The private information supply processor 111 reads the private information (identified via the resident code) from the resident recording system (FIG. 1) or the private information database (FIG. 2), and supplies this information to the picture-attached application data generation terminal apparatus 100.

In step 502, the application entry processor 102 acquires the requested private information from the server 110, and stores the information in memory as the application entry.

In step 503, the application entry processor 102 accepts the supply of other information from the applicant that is necessary for application processing, and stores this information in the memory for the application entry.

In step 504, a determination is made whether the applicant has finished entering the other information. If the end of information entry is indicated, the application entry data production is finished, and processing proceeds to a routine for photograph data generation processing.

Figure 6:
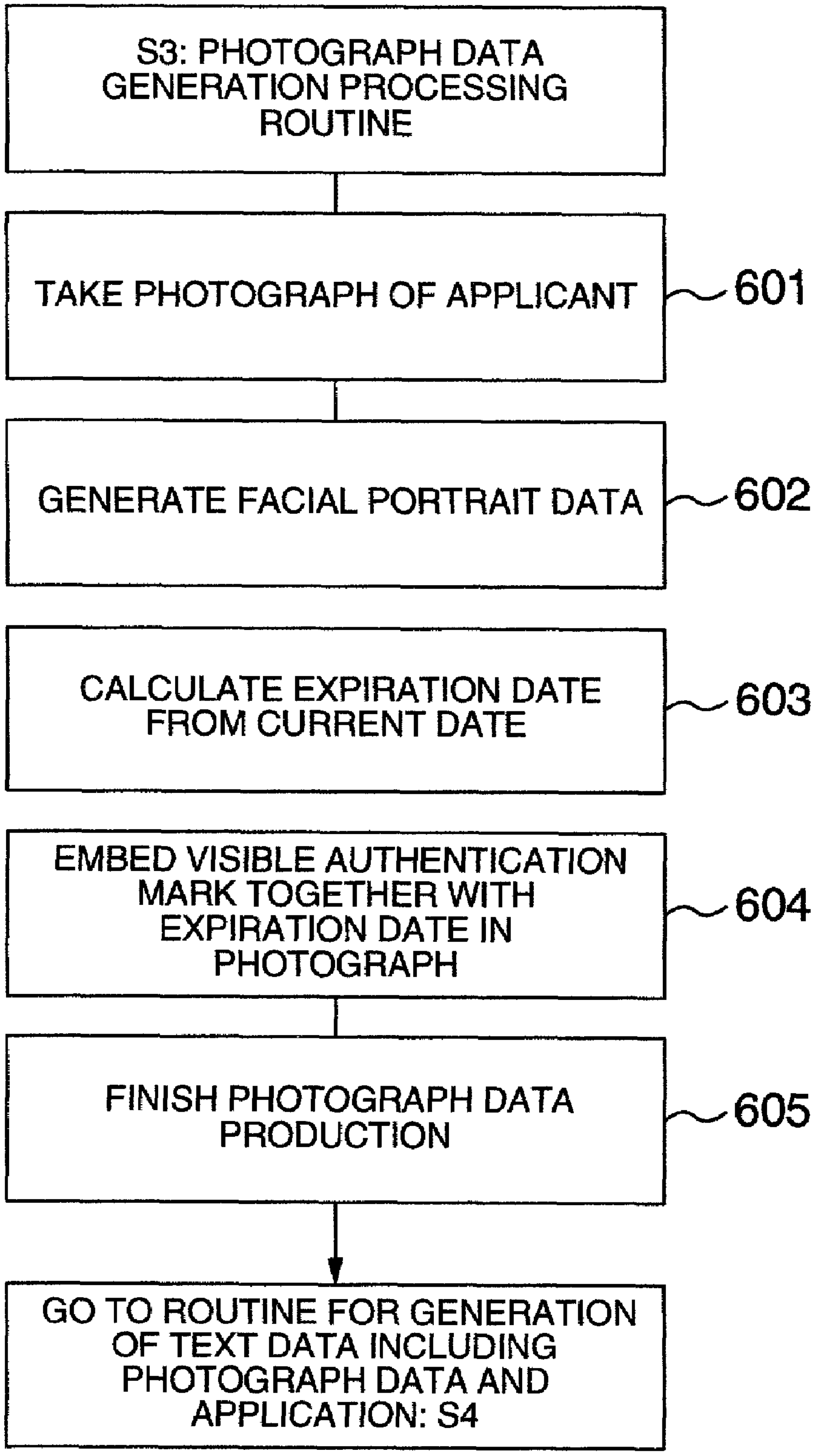
FIG. 6 is a flowchart having steps for a photograph data production procedure according to an embodiment of the present invention.

FIG. 6 is a flowchart of the photograph data generation processing procedure according to one embodiment of the present invention. In step 601, the photograph data generation processor 103 takes a facial portrait of the applicant via a camera incorporated in the terminal apparatus. In step 602, the facial portrait is converted to digital image data. In step 603, the expiration data of the image data is calculated by adding a predetermined period of, for example, six months to the current date.

In step 604, the generated image data, the calculated expiration data of the facial portrait data, and the biometrics of the applicant are sent to server 110. Server 110 is requested to send the facial portrait authentication information that authenticates that the image data is the facial portrait of the applicant.

The authentication information generation processor 112 calculates a hash value of the image data. The processor then uses a secret key provided by server 110 to encrypt the hash value, the expiration data for the facial portrait, and the biometrics to generate the facial portrait authentication information for authenticating that the image data for the facial portrait is the facial portrait of the applicant. This facial portrait authentication information is transmitted to the picture-attached application data generation terminal apparatus 100.

The photograph data generation processor 103 receives the facial portrait authentication information from server 110, and embeds the facial portrait authentication information as a visualized authentication mark in the photographed image data of the facial portrait of the applicant, thus producing the facial portrait data of the applicant.

In step 605, the facial portrait authentication information received from the server 110 is deleted, and the photograph data generation processing is finished. Processing then proceeds to a routine for application data generation processing.

Figure 7:
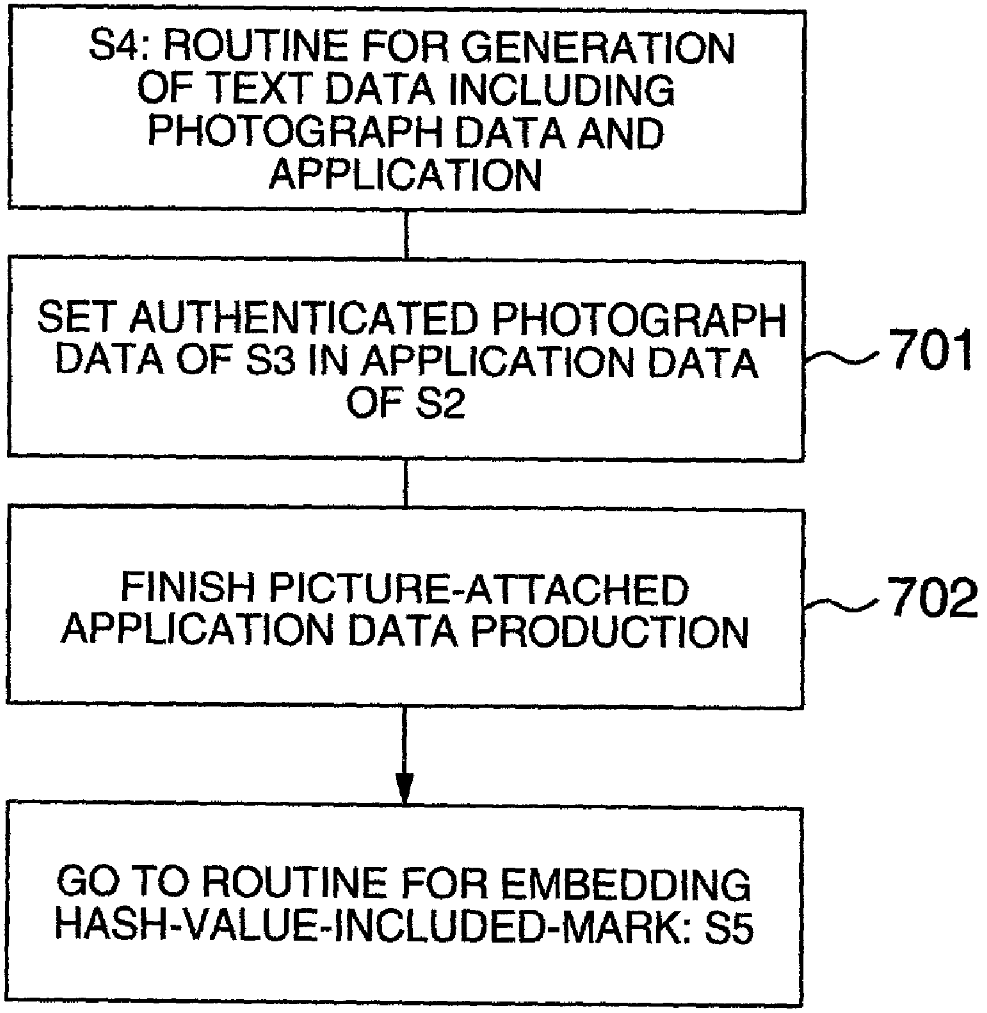
FIG. 7 is a flowchart having steps for an application data generation procedure according to an embodiment of the present invention.

FIG. 7 is a flowchart of the application data generation processing procedure according to one embodiment of the present invention. In step 701, the application data generation processor 104 adds the facial portrait data embedded with the authentication mark to the application entry held in the memory, thus producing the application data.

In step 702, the application entry held in the memory is deleted, and the application data generation processing is finished. The processing then proceeds to a routine for hash-value-included-mark embedding processing.

Figure 8:
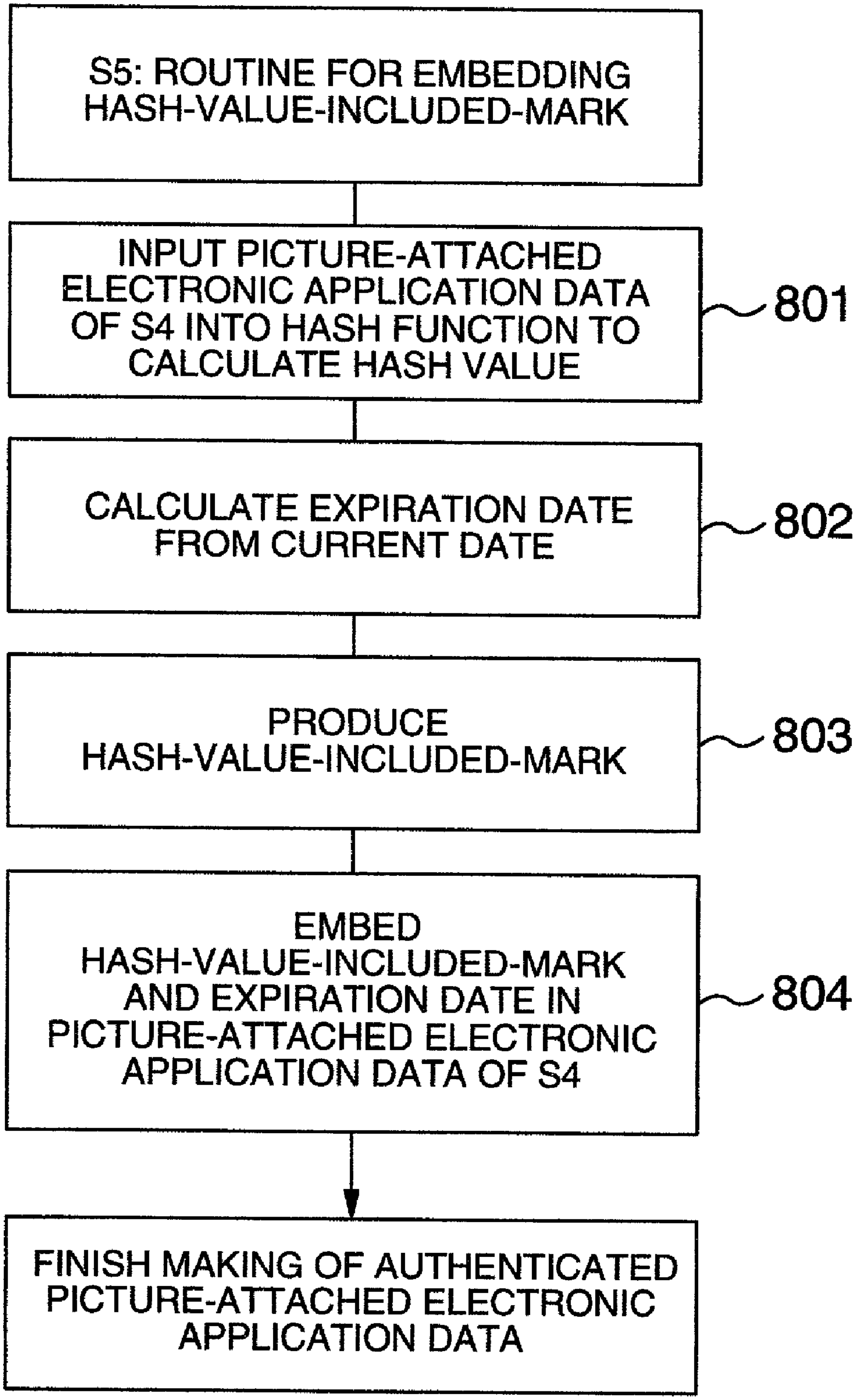
FIG. 8 is a flowchart having steps for hash value mark embedding procedure according to an embodiment of the present invention.

FIG. 8 is a flowchart of the hash-value-included-mark embedding processing procedure. In step 801, the authentication information embedding processor 105 of terminal apparatus 100 sends the generated application data to the server 110, and request the server 110 to send the application data authentication information for authenticating the contents of the application data. The authentication information generation processor 112 of the server 110 calculates the hash value of the application data, and encrypts the hash value by use of the secret key provided by server 110, thus generating the application data authentication information used for authenticating the contents of the application data. The processor then sends the generated application data authentication information to the picture-attached application data generation terminal apparatus 100. The authentication information embedding processor 105 receives the application data authentication information from server 110.

In step 802, the application data expiration data is calculated by adding a predetermined period to the current date. In step 803, the application data authentication information is embedded in the local government mark image of server 110, thus producing an authentication mark. In step 804, the generated authentication mark and the calculated application data expiration data are embedded in the generated application data, thus producing the picture-attached application data.

Figure 9:
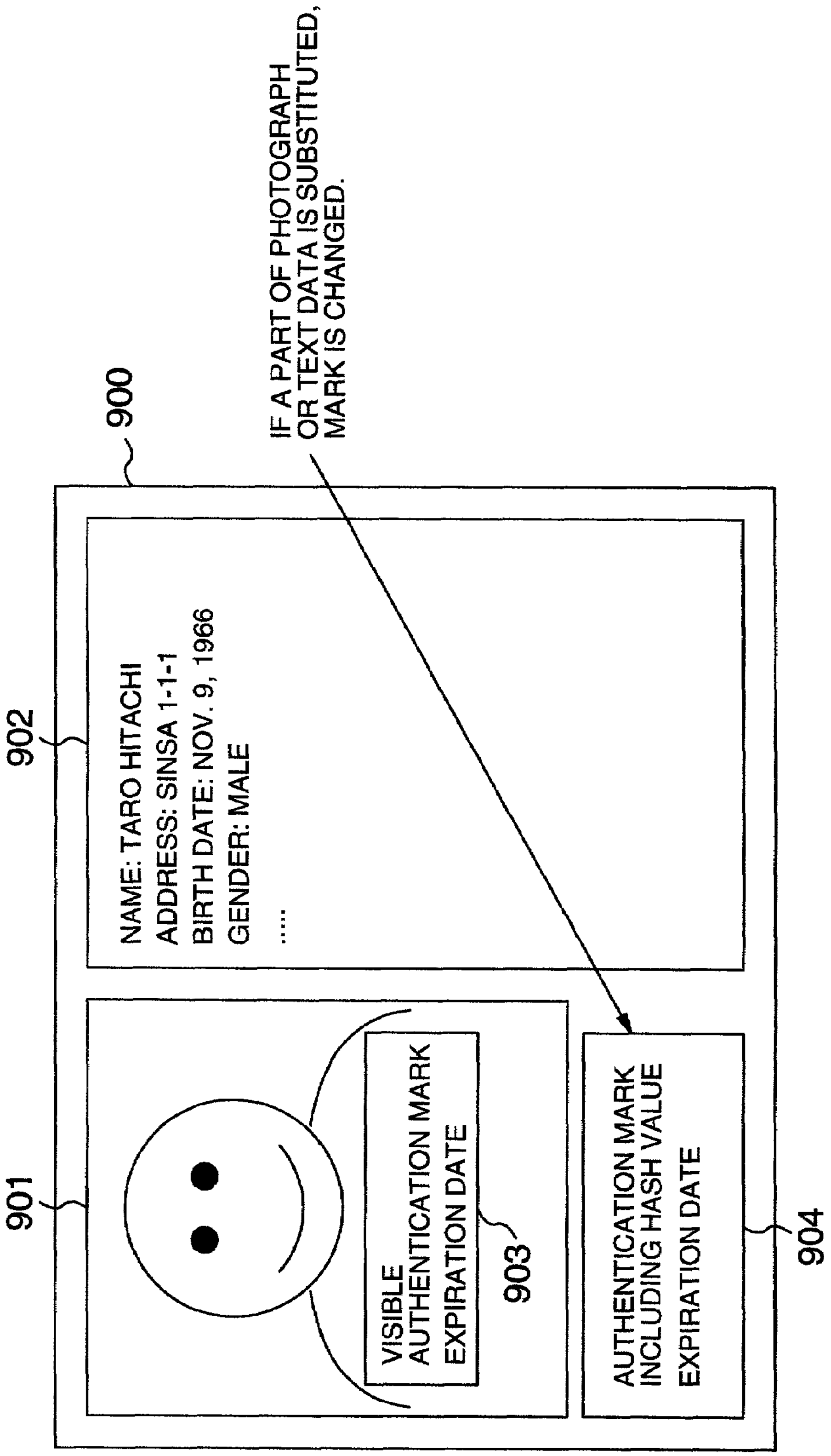
FIG. 9 is a diagram showing a completed image of an application with a facial portrait according to an embodiment of the present invention.

FIG. 9 shows a completed image of the picture-attached application according to one embodiment of the present invention. As shown in FIG. 9, since the picture-attached application data 900 includes the application authentication mark 904 embedded with the application data authentication information (for authenticating the contents of the whole picture-attached application data 900), the substitution of facial portrait data 901 or application entry 902 (i.e., whether a person has substituted the original facial portrait or the original application entry with another facial portrait or another application entry) can be determined via examination of the application data authentication information in the application authentication mark 904.

In addition, since the facial portrait data 901 includes the facial portrait authentication mark 903 embedded with the facial portrait authentication information (for authenticating that the image data indicates the facial portrait of the applicant himself or herself), the facial portrait data 901 can be examined to determine whether the facial portrait data has been substituted when the facial portrait data 901 is reused for the application processing of a driver's license, passport or the like.

A description will be made of the case when the facial portrait data generated in the picture-attached application data production processing is reused in another application process in the picture-attached application data generation system according to one embodiment of the present invention.

While the photograph data generation process shown in FIG. 6 includes steps for generating the facial portrait data of the applicant using the camera built into the terminal apparatus, the facial portrait data generated in another picture-attached application data process is stored in a recording medium, such as the applicant's IC card, and when another application processing is made, the facial portrait data within the recording medium is entered by the facial portrait data input processor 106 of the terminal apparatus 100.

The facial portrait data verification request processor 107 of terminal apparatus 100 supplies the inputted facial portrait data and the biometrics of the applicant who has entered the facial portrait data to the server 110, and requests that server 110 verify that the image data of the facial portrait data indicates that the facial portrait is of the applicant.

The facial portrait data certifying processor 113 of the server 110 reads the facial portrait authentication information from the facial portrait data that has been fed from the picture-attached application data production terminal apparatus 100, decrypts this information, and extracts the hash value for the image data, the facial portrait data expiration date, and the biometrics from the facial portrait authentication information.

The facial portrait data verification processor 113 compares the hash value of the image data and the extracted hash value of the image data from the facial portrait authentication information, and determines whether the image data has been changed (e.g., substituted with image data). Processor 113 then compares the biometrics of the facial portrait authentication information with the biometrics of the applicant, to verify that the image data is for the facial portrait of the applicant. The result of the verification step is transmitted to terminal apparatus 100.

When terminal apparatus 100 receives from server 110 the verification result that indicates that the image data of the facial portrait data is of the applicant, processing proceeds to the application data generation processing of FIG. 7. The application data generation processor 104 adds the facial portrait data to the application entry held in the memory, thus producing the application data.

The described embodiments of the present invention provide reliable and efficient generation of the picture-attached application data as the private information of the applicant is set as the application entry, and since the authentication information is embedded in the facial portrait data and the application data to generate the picture-attached application data.

Moreover, the picture-attached application data may be generated reliably and efficiently as the private information of the applicant is set as the application entry, and since the authentication information is embedded in the facial portrait data and application data to generate the picture-attached application data.

It should be understood by those skilled in the art that various changes and modifications may be made to the described embodiment of the invention without departing from the spirit of the invention and the scope of the appended claims.

What is claimed is:

1. A method for generating data of an application with a picture on a terminal connected to a server via a network, comprising:

a first step of authenticating that a person for whom application data is to be generated is a valid applicant by comparing biometric information read from a resident card provided by the person, wherein biometric information of a resident is recorded on the resident card and is read from the resident card by a card information reading means of the terminal, with biometric information measured from the person with biometric information measuring means;

a second step of reading a resident code from the resident card by the card information reading means if the first step ends in authentication success;

a third step of sending via the network the read resident code to the server;

a fourth step of receiving private information associated with the resident card from the server via the network and storing the private information in a storage unit of the terminal as an application entry;

a fifth step of accepting input of information necessary for the application other than the private information from input means of the terminal and storing input information linking to the private information in the storage unit;

a sixth step of taking a facial portrait of the applicant by a camera of the terminal to make an image data, and calculating a first expiration date of the image data;

a seventh step of requesting from the server via the network, facial portrait authentication information for authenticating that the image data is the facial portrait of the applicant by sending the image data, the first expiration date, and the biometric information to the server;

an eighth step of receiving the facial portrait authentication information from the server via the network and embedding the facial portrait authentication information and information indicating the first expiration data in the image data as a visible first authentication mark to generate a facial portrait data of the applicant;

a ninth step of reading the application entry from the storage unit and attaching the facial portrait data of the applicant on the read application entry to generate the application data;

a tenth step of requesting from the server via the network, application-data-authentication information for authenticating contents of the application data by sending the generated application data;

an eleventh step of receiving the required application-data-authentication information from the server via the network and calculating a second expiration date of the application data; and a twelfth step of embedding the received application-data-authentication information and information indicating the second expiration date into a mark image to make a visible second authentication mark and attaching the second visible authentication mark on the application data to make an authenticated-application data.

2. The method according to claim 1, further comprising:

a thirteenth step of storing the facial portrait data generated in the eighth step is stored in an information-storing medium provided by the applicant, wherein the facial portrait data is read from the information-storing medium and reused by the terminal to make other application data by the steps of:

requesting, to the server, to authenticate the read facial portrait data represents the applicant by sending the read facial portrait data and the biometric information obtained from the applicant to the server, and using the facial portrait data for the other application data if the server authenticates that the facial portrait data represents the applicant.

3. A terminal, connected to a server via a network, for generating data of an application with a picture comprising:

an applicant identification processor for authenticating that a person who requires to make the application data is a valid applicant by comparing biometric information read from a resident card provided by the person with biometric information measured from the person by biometric information measuring means, wherein biometric information on the resident card has been recorded on the resident card for a resident, and wherein the biometric information is read from the card by a card information reading means of the terminal, the card information reading means for reading a resident code from the resident card if the applicant authentication ends in success;

an application entry processor for sending a read resident code to the server for receiving private information linked with the resident card from the server via the network and storing the private information in a storage unit of the terminal as an application entry, and for accepting input of information necessary for the application other than the private information from input means of the terminal and storing input information linking to the private information in the storage unit;

a facial portrait data processor for taking a facial portrait of the applicant by a camera of the terminal to make an image data, calculating a first expiration date of the image data, for requesting from the server via the network, facial portrait authentication information for authenticating that the image data is the facial portrait of the applicant by sending the image data, the first expiration date, and the biometric information to the server, and for receiving the facial portrait authentication information from the server via the network and embedding the facial portrait authentication information and information indicating the first expiration data in the image data as a visible first authentication mark to generate a facial portrait data of the applicant;

an application data generating processor for reading the application entry from the storage unit and attaching the facial portrait data of the applicant on the read application entry to generate the application data;

an authentication information embedding processor for requiring, to the server via the network, application data authentication information for authenticating contents of the application data by sending the generated application data, for receiving the required application data authentication information from the server via the network and calculating a second expiration date of the application data, and for embedding the received application data authentication information and information indicating the second expiration date into a mark image to make a visible second authentication mark and attaching the visible second authentication mark on the application data to make an authenticated application data.

4. The terminal according to claim 3, further comprising:

a facial portrait data input processor for reading the facial portrait data, which has been made and stored by the facial portrait data generation processor, from an information-storing medium, and a facial portrait data verification request processor for requesting from the terminal to the server to authenticate the read facial portrait data represents the applicant by sending the read facial portrait data and the biometric information read from the applicant, wherein the application data generating processor uses the read facial portrait data for the application data when the server authenticates that the facial portrait data represents the applicant.

5. A computer program product configured for storage on a computer readable medium comprising:

code for controlling the operation of an applicant-identification processor for authenticating that a person who requires to make the application data is a valid applicant by comparing biometric information read from a resident card provided by the person with biometric information measured from the person by biometric information measuring means, wherein biometric information on the resident card has been recorded on the resident card for a resident, and wherein the biometric information is read from the card by a card information reading means of the terminal;

code for controlling the operation of an application-entry processor for sending a resident code read from the resident card by card information reading means to the server, if the applicant authentication ends in success, for receiving private information linked with the resident card from the server via the network and storing the private information in a storage unit of the terminal as an application entry, and for accepting input of information necessary for the application other than the private information from input means of the terminal and storing input information linking to the private information in the storage unit;

code for controlling the operation of a facial-portrait-data processor for taking a facial portrait of the applicant by a camera of the terminal to make an image data, calculating a first expiration date of the image data, for requesting from the server via the network facial-portrait-authentication information for authenticating that the image data is the facial portrait of the applicant by sending the image data, the first expiration date, and the biometric information to the server, and for receiving the facial-portrait-authentication information from the server via the network and embedding the facial-portrait-authentication information and information indicating the first expiration data in the image data as a visible-first-authentication-mark to generate a facial portrait data of the applicant;

code for controlling the operation of an application-data-generating processor for reading the application entry from the storage unit and attaching the facial portrait data of the applicant on the read application entry to generate the application data;

code for controlling the operation of an authentication-information-embedding processor for requesting from the server application data authentication information for authenticating contents of the application data by sending the generated application data, for receiving the required application-data-authentication information from the server via the network and calculating a second expiration date of the application data, and for embedding the received application-data-authentication information and information indicating the second expiration date into a mark image to make a visible second authentication mark and attaching the visible second authentication mark on the application data to make an authenticated-application data.

6. The computer program product of claim 5, further comprising:

code for controlling the operation of a facial-portrait-data-input processor for reading the facial portrait data, which has been made and stored by the facial portrait data generation processor, from an information-storing medium, and code for controlling the operation of a facial-portrait-data-verification-request processor for requesting from the terminal to the server to authenticate the read facial portrait data represents the applicant by sending the read facial portrait data and the biometric information read from the applicant, wherein the application data generating processor uses the read facial portrait data for the application data when the server authenticates that the facial portrait data represents the applicant.

* * * * *